(12) United States Patent
Rose et al.

(10) Patent No.: US 10,954,837 B2
(45) Date of Patent: Mar. 23, 2021

(54) SCR DOSER

(71) Applicant: DELPHI TECHNOLOGIES IP LIMITED, St. Michael (BB)

(72) Inventors: Jonathan P. Rose, Turnbridge Wells (GB); Domenico Capolupo, Gillingham (GB); Simon Coster, Chatham (GB); Martin A. P. Sykes, Rainham (GB)

(73) Assignee: DELPHI TECHNOLOGIES IP LIMITED

( * ) Notice: Subject to any disclaimer, the term of this patent is extended or adjusted under 35 U.S.C. 154(b) by 49 days.

(21) Appl. No.: 16/343,172

(22) PCT Filed: Oct. 12, 2017

(86) PCT No.: PCT/EP2017/076128
§ 371 (c)(1),
(2) Date: Apr. 18, 2019

(87) PCT Pub. No.: WO2018/073103
PCT Pub. Date: Apr. 26, 2018

(65) Prior Publication Data
US 2019/0242283 A1 Aug. 8, 2019

(30) Foreign Application Priority Data

Oct. 18, 2016 (GB) .................................. 1617645.5

(51) Int. Cl.
| | | |
|---|---|---|
| *F01N 3/20* | (2006.01) | |
| *F01N 3/027* | (2006.01) | |
| *H01R 13/52* | (2006.01) | |
| *H01R 13/05* | (2006.01) | |

(Continued)

(52) U.S. Cl.
CPC ........... *F01N 3/206* (2013.01); *F01N 3/2066* (2013.01); *H01R 13/05* (2013.01); *H01R 13/5221* (2013.01); *H01R 13/6273* (2013.01); *H01R 31/06* (2013.01); *F01N 2260/26* (2013.01); *F01N 2530/22* (2013.01);
(Continued)

(58) Field of Classification Search
CPC .... F01N 3/206; F01N 3/2066; F01N 2260/26; F01N 2610/02; F01N 2530/22; F01N 2610/1453; H01R 13/05; H01R 13/6273; H01R 31/06; H01R 13/5221; Y02A 50/2325; Y02T 10/24; B01D 53/9418
See application file for complete search history.

(56) References Cited

U.S. PATENT DOCUMENTS 3,293,516 A * 12/1966 Maier ................... F04B 17/046
  318/128
4,552,311 A * 11/1985 Casey .................. F02M 51/005
  239/585.4
4,660,770 A    4/1987 Gieseking
(Continued)

FOREIGN PATENT DOCUMENTS

| | | |
|---|---|---|
| CN | 103775175 A | 5/2014 |
| EP | 2725227 A1 | 4/2014 |
| GB | 2365494 A | 2/2002 |

*Primary Examiner* — Matthew T Largi
(74) *Attorney, Agent, or Firm* — Joshua M. Haines (57) ABSTRACT

A SCR doser includes an electrical adapter extending from an inner end electrically connected to the pins of a solenoid to an outer end having electrical terminals. The outer end outwardly protrudes from an aperture provided in a base wall of the housing of the SCR doser.

12 Claims, 4 Drawing Sheets

(51) Int. Cl.
 *H01R 13/627* (2006.01)
 *H01R 31/06* (2006.01)
(52) U.S. Cl.
 CPC .. *F01N 2610/02* (2013.01); *F01N 2610/1453* (2013.01); *Y02A 50/20* (2018.01); *Y02T 10/12* (2013.01)

(56) References Cited

U.S. PATENT DOCUMENTS

| | | | |
|---|---|---|---|
| 5,603,637 | A | 2/1997 | Matsuoka et al. |
| 8,657,586 | B2 * | 2/2014 | Achor ................. F02M 37/043 417/44.11 |
| 10,677,132 | B2 * | 6/2020 | Thoemmes ........... F01N 3/2066 |
| 2005/0045155 | A1 * | 3/2005 | Harvey ............ F02M 35/10085 123/470 |
| 2005/0247048 | A1 | 11/2005 | Schaller et al. |
| 2007/0033927 | A1 * | 2/2007 | Homby .................... F01N 3/36 60/286 |
| 2013/0270370 | A1 * | 10/2013 | Kondo ............... F02M 51/0614 239/585.1 |
| 2014/0112806 | A1 | 4/2014 | Wright |
| 2016/0053650 | A1 * | 2/2016 | Seitz .................... F16K 49/005 137/340 |

\* cited by examiner

SCR DOSER

CROSS REFERENCE TO RELATED APPLICATIONS

This application is a national stage application under 35 USC 371 of PCT Application No. PCT/EP2017/076128 having an international filing date of Oct. 12, 2017, which is designated in the United States and which claimed the benefit of GB Patent Application No. 1617645.5 filed on Oct. 18, 2016, the entire disclosures of each are hereby incorporated by reference in their entirety.

TECHNICAL FIELD

The present invention relates to a SCR doser and more particularly to an electrical adapter enabling to electrically connect an injector.

BACKGROUND OF THE INVENTION

SCR doser comprise an electro-injector encased in a housing and, the electrical connection of the injector comprises leads extending through the wall of the housing. A problem occurs since the housing comprises at least two members that are welded together after the injector and said leads are arranged in the housing part, the heat generated by the welding potentially damaging said electrical leads.

SUMMARY OF THE INVENTION

Accordingly, it is an object of the present invention to resolve the above mentioned problems in providing a Selective Catalytic Reduction (SCR) doser adapted to be arranged on a vehicle, said SCR doser comprising a injector assembly held in a housing about a main axis. The housing comprises a thick base wall on which is fixed a thinner can having a peripheral wall and a front wall, the housing defining an inner space in which is arranged the injector assembly.

The injector assembly has a body comprising an overmoulded solenoid cooperating with a valve member movable within said body, the body extending about said main axis between a reagent inlet rear end held in a positioning feature of the base wall and, a nozzle front end facing an aperture of the front wall of the housing. Also, electrical leads extend in the body from the solenoid to electrical pins protruding outside the body, said pins being inside said inner space S in an area distant from the base wall of the housing.

Advantageously, the SCR doser further comprises an electrical adapter extending from an inner end electrically connected to said pins to an outer end having electrical terminals, the outer end outwardly protruding from an aperture, provided in the base wall.

Also, the electrical adapter has its own body extending between said inner and outer ends, and in which are arranged electrical leads having sprung electrical pins at the inner end and, said terminals at the outer ends, said sprung pins and terminals protruding from the electrical adapter body for enabling electrical connection of the solenoid.

Also, the electrical adapter is adapted to be inserted through the aperture, specifically provided in the base wall so that, said adapter can be arranged after enclosing the injector assembly in the housing.

Also, the electrical adapter is provided with retaining means features that maintain in place the electrical adapter, once said feature is engaged through said aperture, of the base wall and inside the inner space.

Also, said retaining feature comprises a tab integral to the body of the adapter, said tab having a bevelled face oriented toward the inner end so it enables engagement into the aperture, of the base wall and, a disc face oriented toward the outer end so that it is adapted to abut against said base wall preventing disengagement of the adapter.

Also, said retaining features comprise arms outwardly extending from the adapter body, said arms being flexible for enabling engagement into the aperture of the base wall and, once fully engaged through the aperture said arms expending preventing disengagement of the adapter.

Also, said retaining features comprise a lower grommet arranged at the inner end of the electrical adapter and, and outer grommet arranged between the outer end of the adapter body and the opening in the base wall, said outer grommet being tubular with an inner face engaged in an annular groove provided around the body of the adapter and an outer face provided with another annular groove that engages in the base wall, the electrical adapter being slightly compressed between said inner and outer grommets.

Also, the pin of the solenoid and the aperture, in the base wall of the housing are aligned along a second axis parallel and offset about the main axis, the electrical adapter being straight along said alignment.

Also, a recess for complementary arrangement of an external electrical grommet is dug in the base wall of the housing therein defining a large opening, a peripheral wall and, a bottom wall thinner and integral to the base wall, the aperture through which extends the outer end of the electrical adapter opening in said bottom wall.

Also, the peripheral wall of the recess is provided with an annular groove outwardly extending in the base wall, said groove enabling complementary arrangement of an annular protrusion integral to said electrical grommet.

Also, the cross-section of the annular groove comprises a shoulder face perpendicular to the secondary axis, said shoulder face being arranged so that, in use, an outwardly oriented force pulling the grommet out of the recess is transmitted from the grommet to the base wall via said shoulder face.

Also, the can is welded on the base plate.

The invention further extends to a grommet member adapted to be arranged at an end of an electric cable for electrically connecting a SCR doser as described above, said grommet extending from said electric cable toward an end portion adapted to be connected to outer end of the electrical adapter of the SCR doser, said end portion forming a male cylinder provided on its outer cylindrical face with a male annular protrusion adapted to be complementary arrange in the annular groove of the recess.

The invention further extends a method to assemble a SCR doser as described previously, the method comprising the steps of:
a) providing a base wall, a can defining a peripheral wall and a front wall, a injector assembly and an electrical adapter,
b) arranging the injector assembly in a feature of the base wall,
c) arranging the can over the injector so that an edge of the can complementary arrange on the base wall and, the nozzle of the injector faces an opening of the front wall,
d) welding the can on the base wall in extending a welding seam around said edge area and, the method further comprises:
e) engaging the electrical adapter through an aperture, provided in the base wall, so that the inner end of said adapter electrically connects to the injector and, the outer end of the electrical adapter outwardly protrudes from said opening.

Also, the electrical adapter is provided with a retaining feature that enables the engaging step e) and that prevents later dis-engagement of the electrical adapter.

Also, the engaging step e) is performed after the welding step.

BRIEF DESCRIPTION OF THE DRAWINGS

The present invention is now described by way of example with reference to the accompanying drawings in which.

DESCRIPTION OF THE PREFERRED EMBODIMENTS

Figure 1:
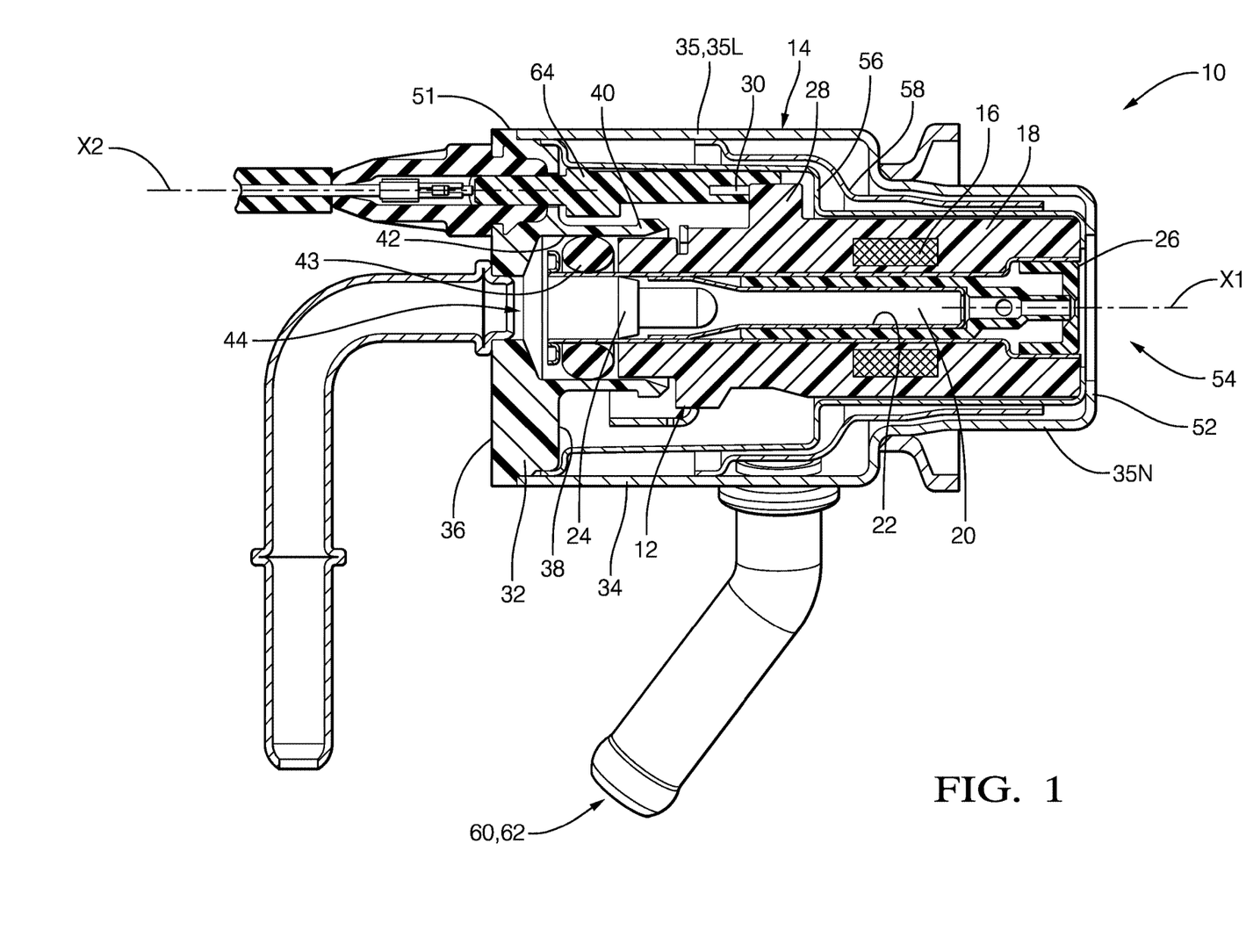
FIG. 1 is an axial section of a SCR doser as per a first embodiment of the invention.

In reference to FIG. 1 is described a selective catalytic reduction doser 10, hereafter SCR doser 10, adapted to spray a reagent fluid such as a urea solution in an exhaust pipe, the reagent enabling reduction of NOx in the exhaust gases.

The SCR doser 10 comprises an injector assembly 12 arranged enclosed in a housing 14.

The injector assembly 12 comprises a solenoid 16 overmoulded in a body 18, the solenoid 16 cooperating with an elongated valve member 20 that is adapted to slide along a main axis X1 in a through bore 22 provided in said body 18. Said through bore 22 opens at an end of the body 18, there forming an inlet 24 for the reagent to flow in the injector, to an opposite end forming a spray nozzle 26. The body 18 is substantially cylindrical and it comprises, substantially half way between the inlet end 24 and the nozzle 26, a radial bump 28 integral and protruding outside the molded body 18, and from which electrical pins 30 extend toward the inlet end 24 in a direction parallel to the main axis X1. Said electrical pins 30 are arranged at the end of electrical leads embedded inside the body 18 and are extending from the solenoid 16 to said pins 30.

The housing 14 comprises a thick circular base wall 32 at the periphery of which is welded a can 34 forming an cylindrical peripheral wall 35 surrounding the injector assembly 12.

Figure 4:
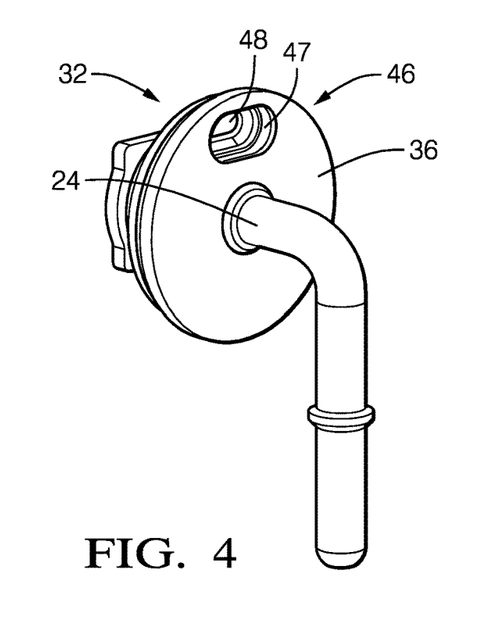
FIG. 4 is a 3D view of a base wall of the SCR doser.

The base wall 32 is arranged transverse to the main axis X1, extending from an outer face 36 to an opposed inner face 38 and it is provided with a tubular member 40 integral to the base wall 32 and axially protruding from the inner face 38, said tubular member 40 defining the peripheral wall of a recess 42 at the center of the bottom of which an inlet channel 44 opens extending through the thickness T of the base wall 32 from said bottom of the recess to the outer face 36. The base wall 32 is further provided with another through aperture 46 radially distant from the inlet channel 44 and extending along a secondary axis X2 parallel and offset to the main axis X1. Said another aperture 46 comprises a outer recess 47 opening in the outer face 36 of the base wall and, a smaller passage 48 pierced in the bottom wall of said outer recess 47. Also, an annular groove 49 dug in the peripheral cylindrical face of the outer recess 47 defines a retaining shoulder face 50 perpendicular to the secondary axis X2. As it is visible on FIG. 4, said aperture 46, recess 47 and smaller passage have a substantially rectangular or oblong section.

The cylindrical peripheral outer face of the base plate comprises step faces enabling complementary engagement of the edge of the can 34 prior to be welded.

The can 34 defines said housing peripheral wall 35 that cylindrically extends from said welded edge 51 to a distant transverse front wall 52 that is provided with an central aperture 54. As visible on the figure, on the embodiment chosen to illustrate the description the peripheral wall 35 comprises a larger portion 35L on the inlet side and a narrower portion 35N on the front wall side. Furthermore, said can 34 is provided with an internal water jacket 56 that is arranged substantially parallel to the peripheral wall 35, said water jacket 56 defining an annular cooling compartment CC in which is arranged an internal partition 58 forcing a flow path to a coolant fluid flowing in the cooling compartment CC between a coolant inlet 60 and a coolant outlet 62 provided in the large portion 35L of the peripheral wall.

In the housing 14, the injector assembly 12 is fixedly arranged in the central space S defined internal to the water jacket 56, the inlet end 24 on the body 18 being inserted in the recess 42 formed by the tubular member 40 extending from the base wall, an O-ring 43 ensuring sealing between the body 18 and the recess 42 and, the nozzle 26 facing the aperture 54 of the front wall of the can 34. Moreover, the injector assembly 12 is angularly oriented so that the electrical pins 30 extending out the bump 28 of the body are aligned along said secondary axis X2 with said another aperture 46 comprising an outer recess 47 and the smaller aperture 48.

The SCR doser 10 further comprises an electrical adapter 64 connected at an inner end 65 to said electrical pins 30 and extending to an outer end 66 that protrudes through said smaller aperture 48 and said outer recess 47.

Figure 2:
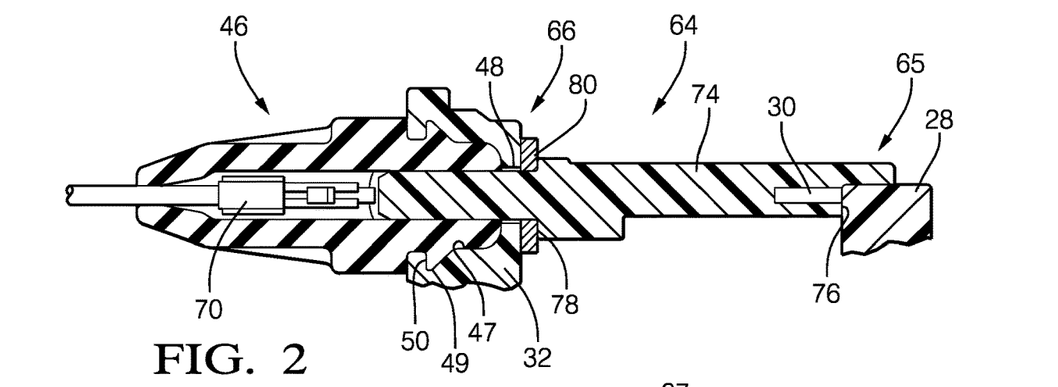
FIG. 2 an axial view of an electrical adapter used on the SCR doser of FIG. 1.
Figure 3:
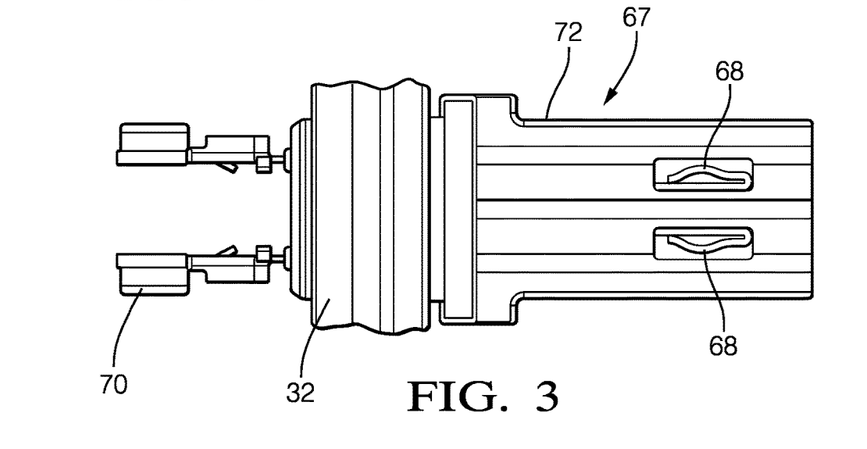
FIG. 3 is another view of the adapter of FIG. 2.

A first embodiment of the electrical adapter 64, is now detailed in reference to the FIGS. 2 and 3, where FIG. 2 presents the adapter 64 in the same section view as in FIG. 1 and, FIG. 3 presents the adapter in a top view, 90° from FIG. 2.

The electrical adapter 64 comprises electrical leads 67 provided at an inner end with sprung pins 68 adapted to deflect and adjust when being engaged on the pins 30 of the injector and, at an outer end with electrical terminals 70, said outer end being engaged through the aperture 46 provided in the base wall. The leads 67 are arranged in a plastic shell 72 overmoulded in an elongated body 74, the end sprung pins 68 and other terminals 70 protruding out of said body 74. The body 74 has a substantially rectangular cross section thinner in the axial plan X1-X2 of FIG. 2, the two electrical leads 67 being one behind the other and, larger in the perpendicular plan of FIG. 3 where the two electrical leads 67 are next to each other. As mentioned above, the aperture 46 and the hole 48 through the base wall have rectangular or oblong cross-section complementary the section of the electrical adapter 64.

The body 74 of the adapter is provided with a first abutment face 76 arranged by the inner end and adapted to cooperate with the bump 28 of the injector body and with a second abutment face 78 arranged by the outer end and adapted to cooperate with the inner face 38 of the base wall. As it is visible on the figures, the adapter 64 is arranged having its body 74 axially X2 maintained between said first 76 and second 78 abutment faces, the sprung pins 68 being in contact with the pins 30 of the injector and, the outer terminals 70 protruding out the outer recess 47. Moreover, in the embodiment presented a soft internal grommet 80 is arranged between said second abutment face 78 and the inner face 38 of the base wall.

Figure 5:
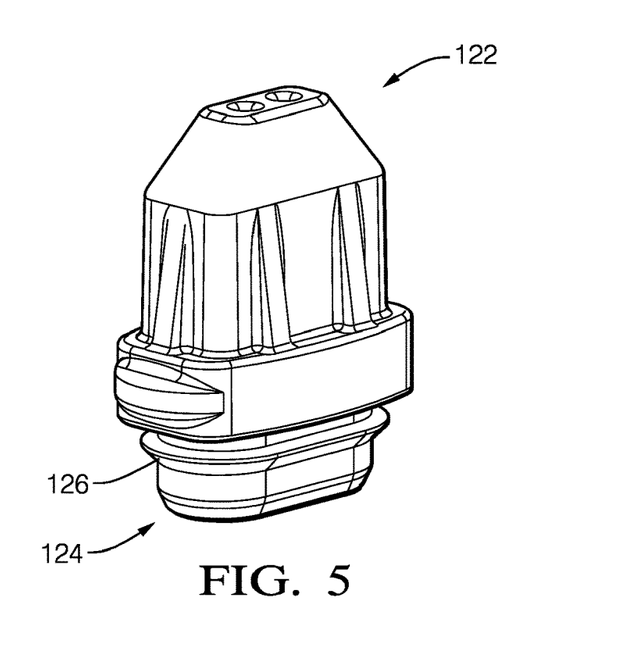
FIG. 5 is a 3D view of a grommet for complementary engagement in a recess provided in the base wall of FIG. 4.

To electrically connect the injector assembly 12, the SCR doser 10 complementary receives an electrical cable 120 adapted to complementary connect to the outer electrical terminals 70 of the adapter 64. The cable 120 has at its extremity an outer grommet 122 represented on FIG. 5 having a head end 124 provided with an annular protrusion 126. Said head end 124 has a rectangular or oblong shape and a cross-section complementary to the outer recess 47 of the base wall wherein it is engaged, the annular protrusion 126 engaging the annular groove 49 so that, any axial X2 force exerted on the cable 120 trying to disconnect the terminals 70 by pulling the outer grommet 122 off the recess 47 is transmitted from the shoulder face 50 to the base wall 32 preventing said accidental disconnection of the injector.

In operation, a reagent enters the SCR doser via the inlet channel 44, flows in the bore 22 around the valve member 20 and, when the solenoid 16 is energized said valve member 20 moves in an open position enabling the reagent to be sprayed via the nozzle 26 of the injector.

A method 100 to assemble the SCR doser comprises the following steps:
  a) providing 102 the base wall 3, the can 34 defining the peripheral wall 35 and the front wall 52, the injector assembly 12 and the electrical adapter 64 as described above,
  b) arranging 104 the injector assembly 12 in the recess of the base wall,
  c) arranging 106 the can 34 over the injector assembly so that an edge 51 of the can complementary arranges on the base wall and, the nozzle 26 of the injector faces the central aperture 54 of the front wall,
  d) welding 108 the can 34 on the base wall 32 in extending a welding seam around said edge 51,
  e) after the heat of the welding step has dissipated, engaging 110 the electrical adapter 64 through the aperture 46 provided in the base wall, so that the inner end of said adapter electrically connects to the injector and, the outer end of the electrical adapter outwardly protrudes from said opening.

To prevent the heat generated during the welding 108 operation to damage the electrical connection of the injector, the electrical adapter 64 is arranged 110 after the welding step 108 and, even after that the heat generated during the welding operation has dissipated.

During the welding operation 108 the pins 30 of the injector are sufficiently distant from the welding area and are not damaged.

Also, the aperture 46 provided in the base wall and through which protrudes the outer end 66 of the electrical adapter has to be larger than the body 74 of the electrical adapter to enable said engagement 110 of the electrical adapter. To prevent later accidental extraction of the electrical adapter 64 by undesired forces exerted on the cable 120 trying to pull the outer grommet 122 away from the base wall, in addition to the groove/protrusion 49/126 complementary arrangement, said electrical adapter 64 can be provided with retaining features 82 described more in details via further embodiments represented on FIGS. 4 to 8.

Figure 6:
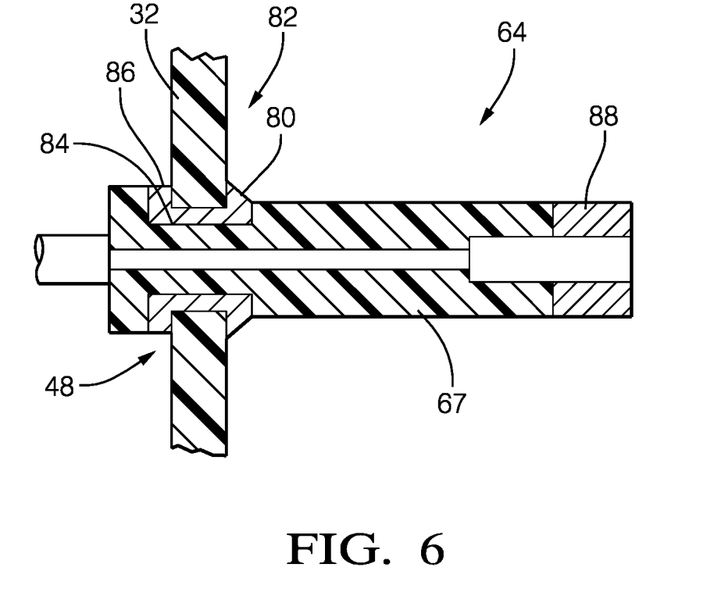
FIGS. 6, 7 and 10 are three alternative embodiment of electrical adapter.

On FIG. 6 is sketched a first embodiment of the retaining feature 82 where an annular groove 84 is provided in the outer end of the body 74 of the electrical adapter and, in said groove 84 is arranged the soft internal grommet 80 previously mentioned. This grommet 80 has, in this first embodiment, a tubular shape the inner face of which being engaged in said groove 84 and the outer face 86 of which defining another annular groove that engages around the aperture 48 on both sides of the base wall. The area of the groove in contact with the inner face of the base wall being quite large, said grommet 80 is provided with a beveled face narrowing the cross-section of the grommet. Furthermore, a lower soft grommet 88 is arranged by the inner end of the electrical adapter 64.

After the welding operation 108, the electrical adapter 64, on which are already arranged the annular grommet 80 and the lower grommet 88, is inserted through the aperture 48. The lower grommet 88 easily passes through said aperture and, the outer grommet 80 needs to be compressed and deformed in order to engage the aperture. Once on the inner side of the base wall, the outer grommet 80 resiliently takes back its original shape, the electrical adapter being now maintained in position between the inner 88 and outer 80 grommets.

This assembly has the advantages to provide water tight sealing at both ends of the adapter 64 and, the soft grommets may slightly distort to accommodate dimensional stack up inherent to the manufacturing of the various parts.

Figure 7:
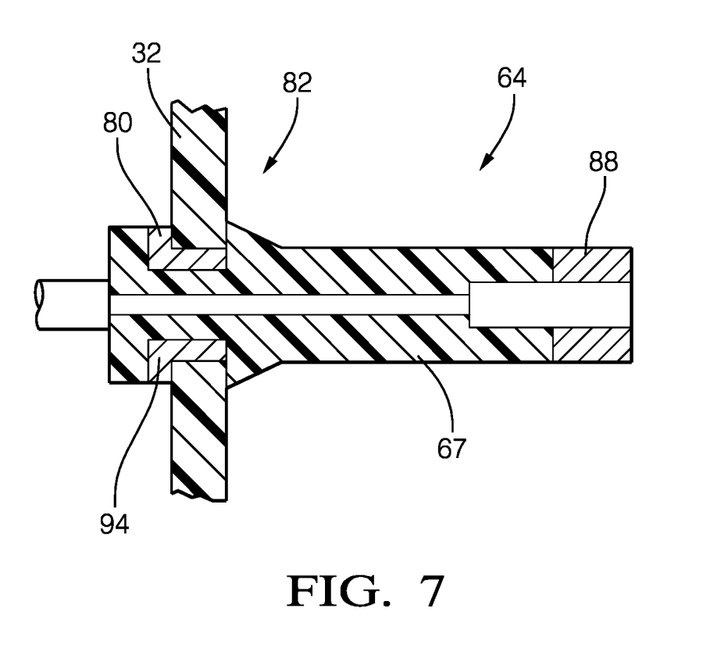
Figure 8:
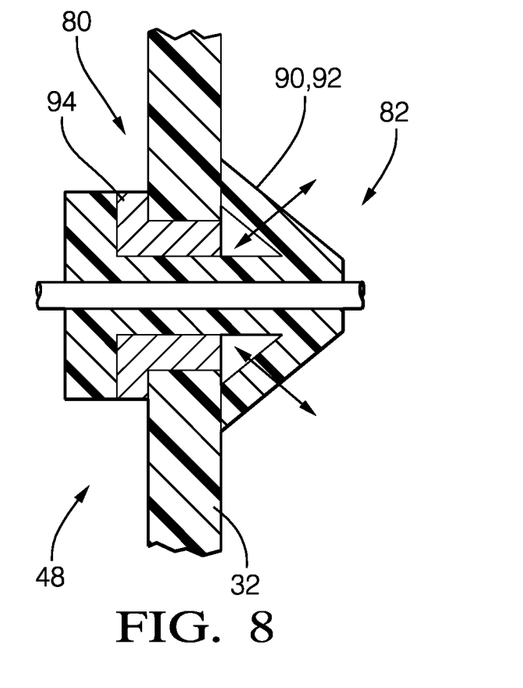
FIGS. 8 and 9 are two different embodiments of magnified views of portion of electrical adapter particularly adapted to the embodiments of FIG. 7.
Figure 9:
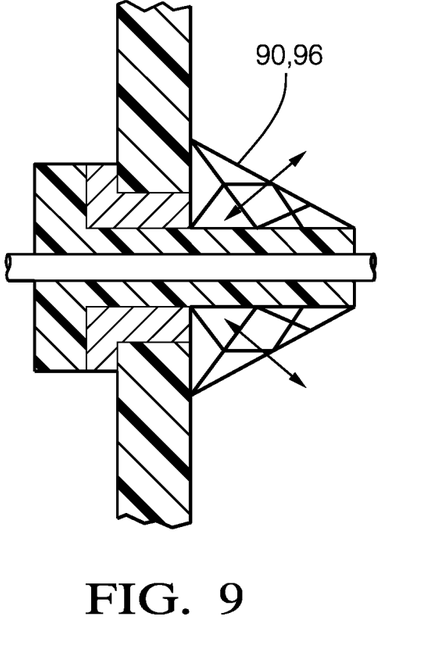

On FIGS. 7, 8 and 9 is sketched a second embodiment and associated alternatives of the retaining features 82 where, with the elongated body 74 are integrally moulded retaining tabs 90 that can be resilient thick arms 92 having one end integral to the body 74 and another end free. Said arms 92 retract along the body 74 when being inserted through the aperture 48 and naturally expand back away from the body once entirely inside the housing. Such pivoting arms are sketched on FIG. 8. In this second embodiment, the outer grommet 80 comprises a tubular portion that engages in the aperture 48, between the body 74 and the base wall and, a collar member 94 that remains between the outer face 36 of the base wall and a collar provided on the very end part of the elongated body 74.

In this embodiment, water tight sealing can be assured by the resilient arms 92 which once deployed in place remain slightly compressed, the collar member 94 being in turn compressed.

In an alternative to the resilient arms of FIG. 8 is presented on FIG. 9, retaining features 82 which comprises a plurality a thinner arms forming a conical network 96 integrally moulded to the elongated body 74 of the electrical adapter, said thinner arms folding back along said body 74 when being inserter in the aperture 46 and expanding in said conical shape once entirely inside the housing 14. Once expanded, the behaviour is similar to the thick arms of FIG. 8, the thin arms slightly compressing the collar 94 of the outer grommet thus ensuring water tight sealing.

Figure 10:
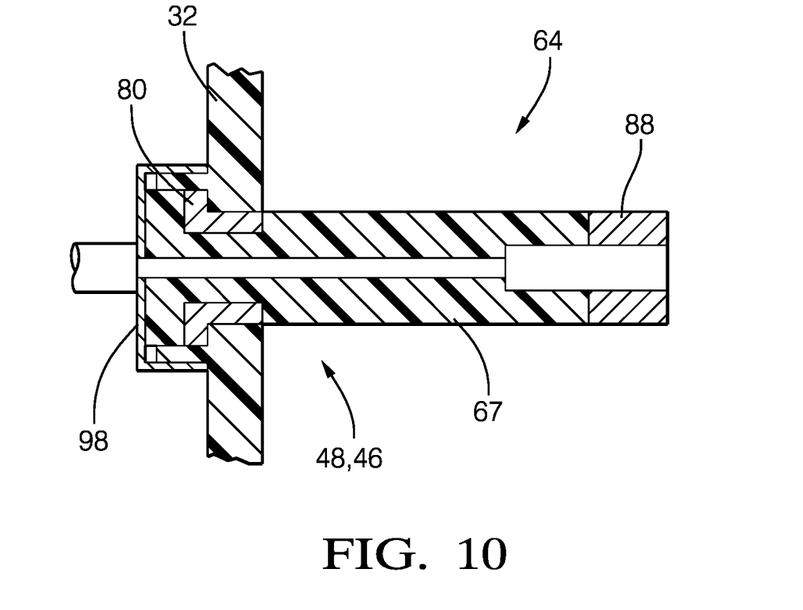

In a third embodiment represented on FIG. 10, the retaining feature 82 comprises a retainer member 98 sketched in the form of a cap arranged around the protruding outer end of the electrical adapter 74, said cap being provided with a hole through which extend the outer terminals 70. The retainer member 98 is fixed to the base plate for instance by press-fit around a tubular protrusion integral to the base wall or any other fixation means deemed appropriate. As previously mentioned, the collar member 94 of the outer grommet would be slightly compressed ensuring sealing of the aperture 48.

LIST OF REFERENCES

X1 main axis
X2 secondary axis
T thickness
CC cooling compartment
S central space
10 SCD doser
12 injector assembly
14 housing
16 solenoid
18 body of the injector
20 valve member
22 bore
24 inlet of the injector
26 nozzle of the injector
28 bump
30 electrical pins
32 base wall
34 can
35 outer peripheral wall
35L large portion
35N narrow portion
36 outer face of the base wall
38 inner face of the base wall
40 tubular member
42 recess
43 O-ring
44 inlet channel
46 electrical aperture
47 outer recess
48 aperture
49 annular groove
50 shoulder face
51 welded edge
52 front wall
54 central aperture
56 water jacket
58 internal partition
60 coolant inlet
62 coolant outlet
64 electrical adapter
65 inner end of the electrical adapter
66 outer end of the electrical adapter
67 electrical leads
68 sprung pins
70 outer electrical terminal
72 plastic shell
74 elongated body
76 first abutment face
78 second abutment face
80 internal grommet—outer grommet
82 retaining feature
84 groove
86 outer face
88 lower grommet
90 retaining tabs
92 resilient arms
94 collar member of the grommet
96 conical network
98 retainer member
100 method
102 providing
104 arranging the injector
106 arranging the can
108 welding
110 engaging the electrical adapter
120 electrical cable
122 outer grommet
124 head end of the outer grommet
126 annular protrusion

The invention claimed is:

1. A Selective Catalytic Reduction (SCR) doser adapted to be arranged on a vehicle, said SCR doser comprising:
an injector assembly held in a housing about a main axis, the housing comprising a thick base wall on which is fixed a thinner can which is thinner than the thick base wall and having a peripheral wall and a front wall, the housing defining an inner space in which is arranged the injector assembly;
wherein the injector assembly has a body comprising a solenoid cooperating with a valve member movable within said body, the body extending about said main axis between a reagent inlet rear end held in a positioning feature of the thick base wall and, a nozzle front end facing an aperture of the front wall of the housing, and wherein electrical leads extend in the body from the solenoid to electrical pins which protrude outside the body, said electrical pins being inside said inner space in an area distant from the thick base wall of the housing;
wherein the SCR doser further comprises an electrical adapter extending from an inner end electrically connected to said electrical pins to an outer end having electrical terminals, the outer end outwardly protruding from an aperture provided in the thick base wall; and
wherein the electrical adapter has its own electrical adapter body extending between said inner end and said outer end in which are arranged adapter electrical leads having adapter electrical pins at the inner end and said electrical terminals at the outer end, said adapter electrical pins and said electrical terminals protruding from the electrical adapter body for enabling electrical connection of the solenoid;
wherein the electrical adapter is adapted to be inserted through the aperture provided in the thick base wall so that, said electrical adapter can be arranged after enclosing the injector assembly in the housing.

2. The SCR doser as claimed in claim 1 wherein said adapter electrical pins are sprung electrical pins.

3. The SCR doser as claimed in claim 1 wherein the electrical adapter is provided with a retention feature that maintains in place the electrical adapter once said retention feature is engaged through said aperture of the thick base wall and inside the inner space.

4. The SCR doser as claimed in claim 3 wherein said retention feature comprises a tab integral to the electrical adapter body, said tab having a bevelled face oriented toward the inner end so it enables engagement into the aperture of the thick base wall, and a disc face oriented toward the outer end so that it is adapted to abut against said thick base wall preventing disengagement of the electrical adapter.

5. The SCR doser as claimed in claim 3 wherein said retention feature comprises arms outwardly extending from the electrical adapter body, said arms being flexible for enabling engagement into the aperture of the thick base wall, and once fully engaged through the aperture, said arms expending preventing disengagement of the electrical adapter.

6. The SCR doser as claimed in claim 3 wherein said retention feature comprises a lower grommet arranged at the inner end of the electrical adapter and an outer grommet arranged between the outer end of the electrical adapter body and the opening in the thick base wall, said outer grommet being tubular with an inner face engaged in an annular groove provided around the electrical adaptor body and an outer face provided with another annular groove that engages in the thick base wall, the electrical adapter being slightly compressed between said inner grommet and said outer grommet.

7. The SCR doser as claimed claim 1 wherein the electrical pins and the aperture in the thick base wall of the housing are aligned along a second axis parallel and offset about the main axis, the electrical adapter being straight along said second axis.

8. A method to assemble the SCR doser as claimed in claim 1, the method comprising the steps of:
   a) providing the base wall, the can defining the peripheral wall and the front wall, the injector assembly and the electrical adapter,
   b) arranging the injector assembly in the positioning feature of the base wall,
   c) arranging the can over the injector assembly so that an edge of the can is complementary arranged on the base wall and the nozzle front end of the injector assembly faces the aperture of the front wall,
   d) welding the can on the base wall in extending a welding seam around said edge, and
   e) engaging the electrical adapter through the aperture provided in the base wall, so that the inner end of said electrical adapter electrically connects to the injector assembly and the outer end of the electrical adapter outwardly protrudes from said opening,
   wherein the engaging step e) is performed after the welding step.

9. The method as claimed in claim 8 wherein the electrical adapter is provided with a retaining feature that enables the engaging step e) and that prevents later dis-engagement of the electrical adapter.

10. A Selective Catalytic Reduction (SCR) doser adapted to be arranged on a vehicle, said SCR doser comprising:
   an injector assembly held in a housing about a main axis, the housing comprising a thick base wall on which is fixed a thinner can which is thinner than the thick base wall and having a peripheral wall and a front wall, the housing defining an inner space in which is arranged the injector assembly;
   wherein the injector assembly has a body comprising a solenoid cooperating with a valve member movable within said body, the body extending about said main axis between a reagent inlet rear end held in a positioning feature of the thick base wall and, a nozzle front end facing an aperture of the front wall of the housing, and wherein electrical leads extend in the body from the solenoid to electrical pins which protrude outside the body, said electrical pins being inside said inner space in an area distant from the thick base wall of the housing;
   wherein the SCR doser further comprises an electrical adapter extending from an inner end electrically connected to said electrical pins to an outer end having electrical terminals, the outer end outwardly protruding from an aperture provided in the thick base wall; and
   wherein the electrical adapter has its own electrical adapter body extending between said inner end and said outer end in which are arranged adapter electrical leads having adapter electrical pins at the inner end and said electrical terminals at the outer end, said adapter electrical pins and said electrical terminals protruding from the electrical adapter body for enabling electrical connection of the solenoid;
   wherein a recess for complementary arrangement of an external electrical grommet is dug in the base wall of the housing, therein defining a large opening, a peripheral wall and, a bottom wall thinner and integral to the base wall, the aperture provided in the thick base wall through which extends the outer end of the electrical adapter opening in said bottom wall.

11. The SCR doser as claimed in claim 10 wherein the peripheral wall of the recess is provided with an annular groove outwardly extending in the base wall, said groove enabling complementary arrangement of an annular protrusion integral to said external electrical grommet.

12. The SCR doser as claimed in claim 11 wherein a cross-section of the annular groove comprises a shoulder face perpendicular to the second axis, said shoulder face being arranged so that, in use, an outwardly oriented force pulling the grommet out of the recess is transmitted from the external electrical grommet to the thick base wall via said shoulder face.

* * * * *